United States Patent [19]

Dickirson

[11] Patent Number: 4,697,832
[45] Date of Patent: Oct. 6, 1987

[54] SNAP LOCK CONNECTOR

[75] Inventor: Gene D. Dickirson, London, United Kingdom

[73] Assignee: Ford Motor Company, Dearborn, Mich.

[21] Appl. No.: 830,416

[22] Filed: Feb. 18, 1986

[51] Int. Cl.[4] .............................................. F16L 37/00
[52] U.S. Cl. ...................................... 285/319; 285/921
[58] Field of Search .............. 285/319, 320, 921, 330, 285/5, 6, 349

[56] References Cited

U.S. PATENT DOCUMENTS

| | | | |
|---|---|---|---|
| 2,021,241 | 11/1935 | Mall | 285/161 |
| 2,110,397 | 3/1938 | Kangas | 255/64 |
| 2,270,926 | 1/1942 | Briegel et al. | 285/330 X |
| 2,567,727 | 9/1951 | Quackenbush | 173/363 |
| 2,886,355 | 5/1959 | Wurzel | 287/52 |
| 3,097,871 | 7/1963 | McNally | 287/117 |
| 3,120,966 | 2/1964 | Lyon | 285/349 X |
| 3,245,703 | 4/1966 | Manly | 285/319 |
| 3,279,835 | 10/1966 | Krohm | 287/119 |
| 3,298,723 | 1/1967 | Damm | 287/119 |
| 3,314,696 | 4/1967 | Ferguson et al. | 285/174 |
| 3,347,293 | 10/1967 | Clark | 145/50 |
| 3,367,692 | 2/1968 | Balian | 287/103 |
| 3,450,424 | 6/1969 | Calisher | 285/305 |
| 3,552,775 | 1/1971 | Warner | 280/492 |
| 3,574,362 | 4/1971 | Gregg | 285/321 |
| 3,584,902 | 6/1971 | Vyse | 285/305 |
| 3,625,551 | 12/1971 | Branton | 285/305 |
| 3,881,753 | 5/1975 | Bochory | 285/92 |
| 3,922,011 | 11/1975 | Walters | 285/277 |
| 3,973,791 | 8/1976 | Porta et al. | 285/305 |
| 4,009,896 | 3/1977 | Brewer | 285/305 |
| 4,059,295 | 11/1977 | Helm | 285/305 |
| 4,063,760 | 12/1977 | Moreiras | 285/242 |
| 4,126,338 | 11/1978 | Coel et al. | 285/330 |
| 4,194,765 | 3/1980 | Reddy | 285/27 |
| 4,198,080 | 4/1980 | Carpenter | 285/277 |
| 4,219,222 | 8/1980 | Brusadin | 285/8 |
| 4,220,361 | 9/1980 | Brandenberg | 285/921 X |
| 4,226,445 | 10/1980 | Kramer | 285/39 |
| 4,266,814 | 5/1981 | Gallagher | 285/319 |
| 4,541,658 | 9/1985 | Bartholomew | 285/319 |

FOREIGN PATENT DOCUMENTS 2028712  6/1970  Fed. Rep. of Germany.
1071978  6/1967  United Kingdom ............... 285/319

Primary Examiner—Dave W. Arola
Attorney, Agent, or Firm—Frank G. McKenzie; Donald J. Harrington

[57] ABSTRACT

A coupling for connecting hydraulic conduits includes a tube formed with multiple depressions that are angularly and axially mutually spaced on the surface of the tube, a spring latch having a corresponding pattern of multiple protrusions adapted to fit within the depression of the tube, a connector body permanently mechanically connected to one of the hydraulic conduits defining a recess into which is fitted an O-ring, and a bar adapted to be locked on the spring latch. The O-ring provides a hydraulic seal between the conduits. The latch includes an inclined surface with which the bar makes contact and by means of which the latch is deflected as the conduits are forced axially together. When the bar clears the apex of the inclined surface, it becomes locked within a recess on the upper surface of the latch preventing axial disconnection of the conduits.

4 Claims, 9 Drawing Figures

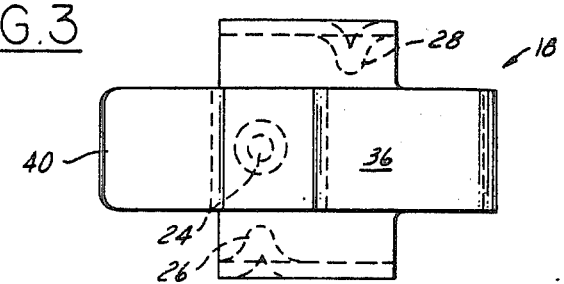
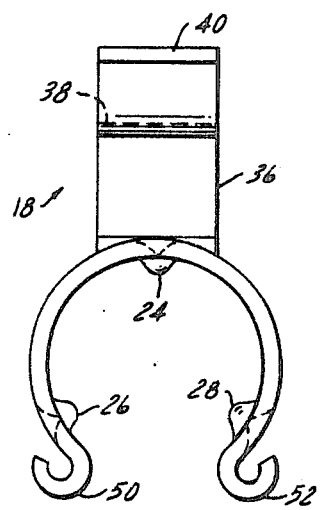
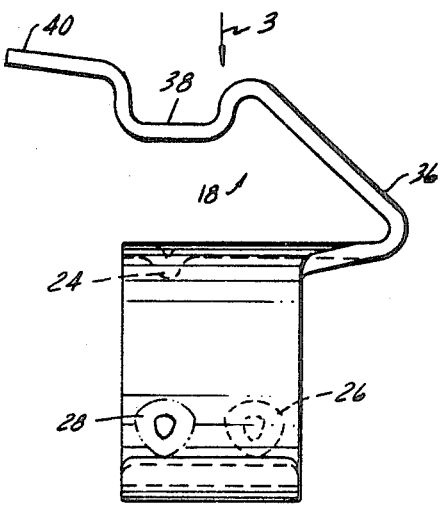
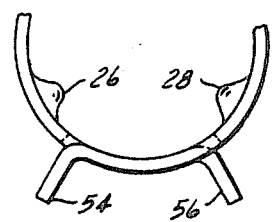
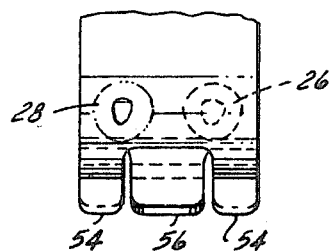

4,697,832

SNAP LOCK CONNECTOR

BACKGROUND OF THE INVENTION

1. Field of the Invention

This invention relates to couplings for hydraulic fluid lines. More particularly, the invention pertains to quickly detachable fluid couplings.

2. Description of the Prior Art

U.S. Pat. No. 4,266,814 describes a fitting for receiving and locking a plastic tube in position. It includes a hollow tubular member having compression barbs and flexible locking barbs for gripping the tube and fixing its position with respect to the adapter. The tube has several locking barbs, which have sharp cornered ends adapted to engage and lock a plastic tube in place. The tube includes a set of compression barbs which engage a beam to clamp the tubing into position. The locking barbs bind the surface of the tubing and prevents disassembly of the adapter. The force required to assemble and disconnect the adapter varies substantially with the temperature of the components and the stiffness of the tubing. This coupling is not suited for use with the large temperature variations of approximately 300 degrees F. to which the radiator hose of an internal combustion is subjected. High temperature softens the plastic tube and lowers the coupling strength. Low temperature stiffens and shrinks the tubing and could cause leakage between the tube and components. There is no positive indication of complete engagement, either visual or audible.

The quickly detachable pipe coupling described in U.S. Pat. No. 3,245,703 include male and female members that are locked together by means of resilient latch fingers on the male member. These latching elements are received on an interior annular recess located on the female member. The assembly of the coupling requires the pressing of two fingers concurrently and then inserting one member within the other until they reach a locking position. The displacement of the finger during assembly requires a radial gap along the male member in order to accommodate the displacement. There is no tendency in the process of assembling this coupling for the coupling members to be forced axially away from one another after the end of the finger clears the edge of the female member. In addition, there is no positive indication of complete engagement because the end of the fingers are not visible once they clear the end face of the female member.

BRIEF DESCRIPTION OF THE DRAWING

FIG. 2 is a front view of a spring latch.

FIG. 3 is a top view of the spring latch of FIG. 2 viewed in direction 3.

FIG. 4 is a side view of the spring latch of FIG. 2.

FIG. 5 is a partial side view of an alternate embodiment of the spring latch.

FIG. 6 is a partial, front view of the alternate embodiment of FIG. 5.

SUMMARY OF THE INVENTION

Figure 1:
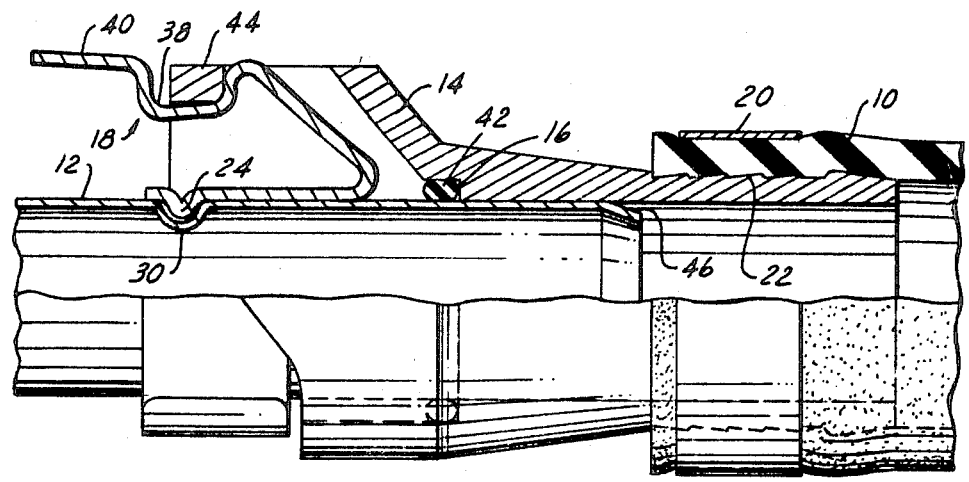
FIG. 1 is a cross section through the longitudinal axis of the connector in the assembled position.
Figure 9:
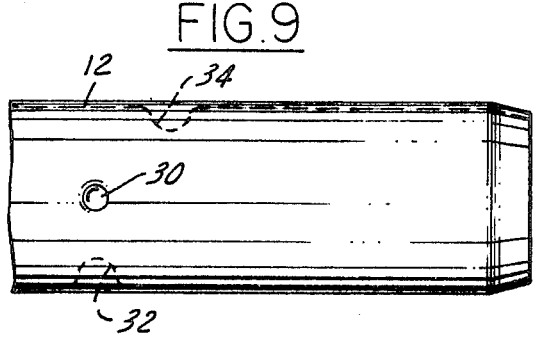
FIGS. 7, 8 and 9 are front, top and end views, respectively, of a tubular member of the hydraulic connector according to this application.
Figure 7:
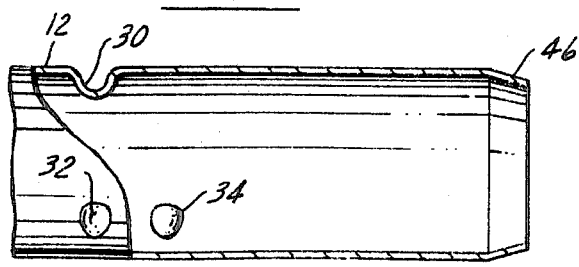
Figure 8:
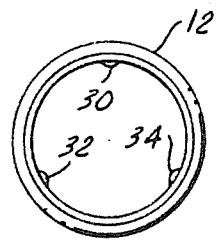

The coupling according to this invention mechanically and hydraulically connects fluid-carrying conduits. It includes a connector body, joined mechanically by serrations on its outer surface to one of the conduits, preferably a rubber hose or a cylindrical conduit made from an elastomer. The connector body includes a latching bar that is directed transversely with respect to the longitudinal axis of the conduits that it connects. An open ended recess is formed on the inner surface of the connector body to receive an O-ring located within and retained in the recess. The coupling includes a tube sized to fit within the connector and adapted to slide across the surface of the O-ring to compress the O-ring, thereby forming a hydraulic seal between the connector body and tube. A metal spring latch formed of spring wire is carried on the outer surfaces of the tube. The angular position of the latch about the longitudinal axis and its axial position on the tube is established by locating protuberances formed on the latch within recesses formed on the tube. The protuberances and recesses are sized to fit closely together and to retain the latch in position on the tube.

The latch includes a surface that contacts the latching bar as the tube is moved within the connector body. The surface is inclined radially so that the latch is displaced radially inward due to its contact with the latching bar. Located at the upper end of the inclined surface and immediately beyond its apex is a recess sized to receive and to hold within it the latching bar. The resilient inward radial displacement of the latch caused by its contact with the inclined surface continuously applies an axially directed force to the connector body tending to force the tube and the connector body apart until the tube has been inserted sufficiently far within the connector body that the latching bar moves past the apex of the inclined surface and becomes seated within the recess on the spring latch. When the locking bar clears the apex of the inclined surface, the latch is released from its deflective position and immediately springs radially outward to the bar and the recess.

The coupling is disassembled manually by applying a radially inwardly directive force to a tab on the latch. This displaces the latch radially inward and moves the recess out of engagement with the latching bar. After the bar clears the apex of the inclined surface, the coupling is disconnected by moving the connector body axially away from the tube.

DESCRIPTION OF THE PREFERRED EMBODIMENT

The snap lock connector of this invention makes a mechanical, fluid-tight connection between a hose 10 and a tube 12, whose axes are colinear at least within the region where the connection is being made. The connector includes a body 14, an O-ring 16 and a spring clip or latch 18.

The hose may be of rubber or an elastomeric material that can be deformed readily to conform with the serrations formed on the outer surface of the connector body. The connection made between the hose and body is made by forcing the connector within the hose and then crimping a furrule 20 over the outer surface of the hose to apply an inwardly direct pressure to the connector body from the hose.

The spring latch 18 includes three spherical, inwardly directed protrusions 24, 26, 28 formed on its inner surface. The protrusions of the latch are adapted to fit within matching spherical depressions 30, 32, 34 formed on the outer surface of tube 12. The depressions and protrusions are positioned so as to permit assembly of the spring latch in only one position on the tube. This is accomplished by arranging the pattern of depressions and protrusions so that each pair is displaced axially along the latch and tube and radially around the longitudinal axis. The spring latch includes an inclined surface 36, a recess 38, and a tab 40.

The connector body includes a recess 42, adapted to receive O-ring 16 therewithin, and a transversely directed bar 44, adapted to fit within recess 36. The tube includes an inclined beveled surface 46 that facilitates insertion of the tube within the connector body and location of the spring latch on the outer surface of the tube.

The spring latch is assembled to the tube by applying a force to the latch that will increase its diameter. This force can be applied to the arcuate free ends 50, 52 seen in FIG. 4; or the expanding force can be applied to the tabs 54, 56 shown in FIGS. 5 and 6. The expanding force is applied to increase the size of that portion of the latch that is fitted over the tube, and the force is removed when the spherical protrusions are located within the repetitive depressions.

The connection between the hose and the tube is made after the connector body is secured to the hose and the O-ring is fitted within recess 42. Then bar 44 on the connector is forced into contact with the inclined surface 36 on the latch as the tube and body are moved axially together. As additional force is applied and the inclined surface is aligned angularly with the latching bar, surface 36 will deflect radially inward due to the force acting on it from the bar. Eventually, the bar clears the upper end of the inclined surface and becomes seated within the recess 38. The latch then springs radially outward and locks the latching bar within the recess, thereby mechanically connecting and hydraulically sealing the tube and the hose.

To dissemble this connection, a force directed radially and downwardly is applied to tab 40 with sufficient magnitude to deflect the spring latch until the upper end of the inclined surface clears bar 44. Then oppositely directed axial forces applied to the hose and the tube while the latch is in the deflected position permit the connector body to become disconnected from the spring latch.

Having described a preferred embodiment of my invention, what I claim and desire to secure by U.S. Letters Patent is:

1. A coupling for connecting fluid carrying conduits comprising:
    a connector body adapted for connection to one of the conduits including a latching bar directed transversely to the longitudinal axis of the conduits;
    a tube adapted for sliding support within the connector body;
    means for hydraulically sealing the adjacent surfaces of the connector body and the tube;
    a spring latch fixed to the tube having a radially inclined surface contacted by the latching bar as the tube and connector body move toward a connected position, having means for releasably connecting the connector body and the tube; and
    means for locating the angular and axial position of the spring latch at only one position with respect to the tube including multiple depressions on the surface of the tube, two of said depressions being located in a plane normal to the longitudinal axis of the tube, one of said depressions being spaced axially from said plane, at least one of said depressions in said plane being spaced angularly about the longitudinal axis of the coupling from another of said depressions and multiple protuberances formed on the spring latch located for engagement in the depressions of the tube.

2. The coupling of claim 1 wherein the sealing means includes an annular recess formed on the inner surface of the connector body adjacent the tube, the recess being defined by an axial surface that faces the spring latch and a radial surface that faces the tube.

3. The coupling of claim 1 wherein the connecting means includes a recess formed on the spring latch, located adjacent the radially upper end of the inclined surface and adapted to receive the latching bar therein.

4. The coupling of claim 2 wherein the connecting means includes a recess formed on the spring latch, located adjacent the radially upper end of the inclined surface and adapted to receive the latching bar therein.

* * * * *